N. F. THOMPSON.
BOTTLE CLOSURE.
APPLICATION FILED JAN. 13, 1914.
1,104,578.
Patented July 21, 1914.
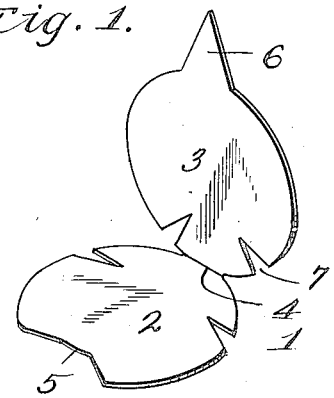
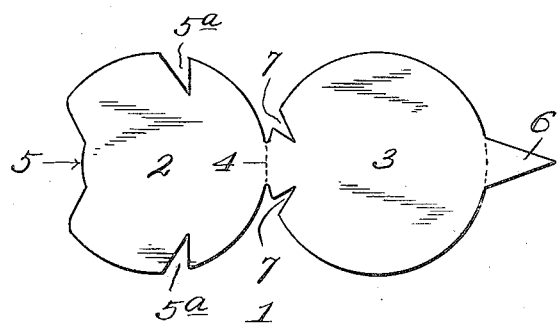
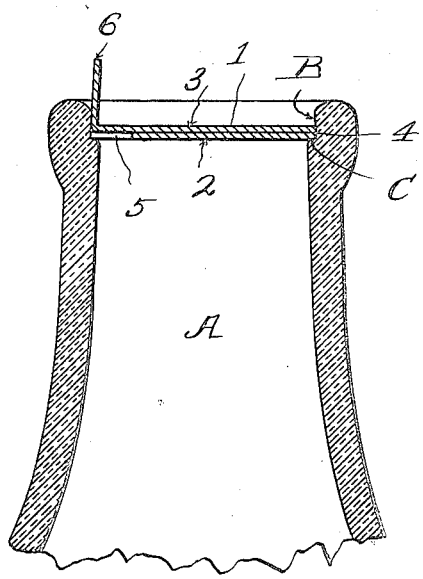
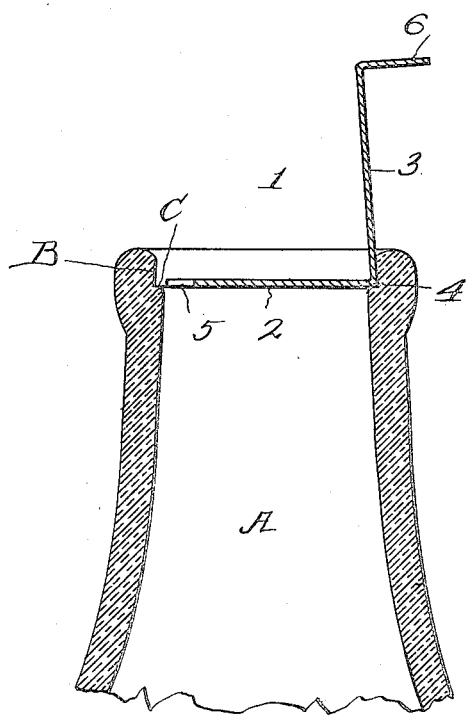
WITNESSES:
INVENTOR:
Nels F. Thompson,
BY
ATTORNEY.

UNITED STATES PATENT OFFICE.

NELS F. THOMPSON, OF KANSAS CITY, MISSOURI.

BOTTLE-CLOSURE.

1,104,578.   Specification of Letters Patent.   Patented July 21, 1914.

Application filed January 13, 1914. Serial No. 811,793.

*To all whom it may concern:*

Be it known that I, NELS F. THOMPSON, a citizen of Sweden, residing at Kansas City, in the county of Jackson and State of Missouri, have invented certain new and useful Improvements in Bottle-Closures, of which the following is a specification.

My invention relates to improvements in sanitary bottle caps, and my object is to provide a closure for milk bottles which will permit pouring of milk from the bottle without entirely removing the closure.

Where the customary disk-like cap is employed for closing milk bottles its removal is accompanied by more or less splashing of milk from the bottle. Frequently after such removal the cap is lost and the contents of the bottle is exposed to the outer atmosphere and flies, rendering the contents unfit for use.

By employing my device, the milk may be poured from the bottle without entirely removing the cap and consequently there will be no splashing of milk or loss of said cap.

In order that the invention may be fully understood, reference will now be made to the accompanying drawing, in which:

Figure 1 is a detail perspective view of the cap. Fig. 2 is a plan view of the cap fully opened. Fig. 3 is a vertical cross section of the upper portion of a bottle provided with the cap, the latter being closed. Fig. 4 is a vertical section of the upper portion of the bottle, with the cap open, so that milk may be poured from the bottle.

A designates a bottle of the type usually employed for holding milk. The upper portion of said bottle has an internal marginal recess B terminating at its lower side in a shoulder C.

1 designates my cap which is made of card-board or other suitable material, preferably, rendered waterproof by treatment with paraffin, or the like.

Cap 1 comprises a supplemental lid 2 and a main lid 3, preferably, stamped from one piece of material and united at one side with a hinge-like portion 4, whereby the main lid 3 may be raised and lowered independently of the supplemental lid 2.

The supplemental lid 2 is provided at a point diametrically-opposite the hinge 4 with an outlet port 5, through which the milk may be poured without removing the cap from the bottle. The supplemental lid 2, has air inlet ports 5ª, which admit air to the bottle and thus insure a free flow of milk through the outlet port 5 when the bottle is tipped up.

The main lid 3 is provided with a marginal tab 6, whereby it can be readily opened or closed. The main lid 3 is made slightly resilient by marginal recesses 7, at opposite sides of the hinged portion 4.

In practice, the cap is placed in position in the upper end of the bottle by forcing it therein until the supplemental lid 2 rests firmly upon the shoulder C. The resiliency of the supplemental lid due to the ports 5—5ª, insures sufficient friction to hold said lid in position. When it is desired to pour out a portion of the bottle contents, the main lid 3 is opened by pulling upward on the tab 6, after which the contents may be poured through the port 5. After the desired amount has been poured out, the main lid 3 is forced down firmly upon the supplemental lid 2, thus completely closing the port 5 and the recesses 5ª. The resiliency of the main lid 3 obtained by the incisions 7, creates sufficient friction between the periphery of said main lid 3 and the annular wall of the recess B, to firmly hold the main lid 3 in closed position until raised by hand. When the main lid 3 is closed, its marginal tab 6 bears against and is held in upright position by the adjacent side of the bottle, so that said tabe can be readily grasped when the lid is to be opened.

Having thus described my invention, what I claim and desire to secure by Letters Patent is:

1. A closure for bottles, consisting of a supplemental lid having a marginal port, a main lid hinged to said supplemental lid and having incisions, and a marginal tab on said main lid.

2. A closure for bottles, consisting of two lids hinged together, one of said lids having a shoulder diametrically opposite its hinged portion, and both lids having marginal incisions to render them resilient, for the purpose set forth and described.

3. In combination with a bottle having an annular internal recess terminating at its lower side in a shoulder, and a cap consisting of a supplemental lid and a main lid hinged together and adapted to fit snugly upon said shoulder, the supplemental lid having an outlet port diametrically opposite its hinged portion and two marginal inlet ports, the main lid having two marginal incisions to render it resilient and a marginal tab, which latter bears against and is held in an upright position by the adjacent side of the bottle when the main lid is in closed position, for the purpose set forth and described.

In testimnoy whereof I affix my signature, in the presence of two witnesses.

NELS F. THOMPSON.

Witnesses:
F. G. FISCHER,
FRED C. FISCHER.